US012241355B2

(12) United States Patent
Fidjestoel et al.

(10) Patent No.: US 12,241,355 B2
(45) Date of Patent: Mar. 4, 2025

(54) DRILLING SYSTEMS AND METHODS

(71) Applicant: MHWIRTH AS, Kristiansand (NO)

(72) Inventors: Ragnhild Moerner Fidjestoel, Soegne (NO); Thor Arne Brandsvoll, Kristiansand (NO); Ann Jorid Haugland, Kristiansand (NO); Kai Adne Kostoel, Kristiansand (NO)

(73) Assignee: MHWIRTH AS, Kristiansand (NO)

( * ) Notice: Subject to any disclaimer, the term of this patent is extended or adjusted under 35 U.S.C. 154(b) by 1060 days.

(21) Appl. No.: 17/267,029

(22) PCT Filed: Aug. 7, 2019

(86) PCT No.: PCT/NO2019/050161
§ 371 (c)(1),
(2) Date: Feb. 9, 2021

(87) PCT Pub. No.: WO2020/032802
PCT Pub. Date: Feb. 13, 2020

(65) Prior Publication Data
US 2021/0301639 A1   Sep. 30, 2021

(30) Foreign Application Priority Data
Aug. 10, 2018   (GB) ...................................... 1813074

(51) Int. Cl.
*E21B 44/00*   (2006.01)
*E21B 47/12*   (2012.01)
*G05B 23/02*   (2006.01)

(52) U.S. Cl.
CPC ............... *E21B 44/00* (2013.01); *E21B 47/12* (2013.01); *G05B 23/027* (2013.01); *G05B 23/0272* (2013.01); *E21B 2200/20* (2020.05)

(58) Field of Classification Search
CPC ...... E21B 44/00; E21B 47/12; E21B 2200/20; E21B 41/00; G05B 23/027; G05B 23/0272
(Continued)

(56) References Cited

U.S. PATENT DOCUMENTS

2005/0096846 A1   5/2005   Koithan et al.
2007/0185696 A1   8/2007   Moran et al.
(Continued)

FOREIGN PATENT DOCUMENTS

CN   105683498 A * 6/2016   ............. E21B 21/08
EP   2 222 937 A2   9/2010
(Continued)

*Primary Examiner* — Cedric Johnson
(74) *Attorney, Agent, or Firm* — Norman B. Thot

(57) ABSTRACT

A drilling system includes machines, process sensors, and a drilling ECU. Each machine has machine sensor which senses an operating state and an operating range with a lower and upper limit. Each process sensor has a process sensor value and a process range with a lower and upper limit. The drilling ECU includes a data processing apparatus and a memory. The memory includes a process model with expected values of the process sensors as a function of a drilling depth, and a reservoir model with geological data. The drilling ECU receives the process sensor value and the operating state, calculates first differences between the process sensor values and the upper limit and/or the lower limit of the process range, calculates second differences between the operating state and the upper limit and/or lower limit of the operating range, and displays the first and second differences on a drilling screen.

12 Claims, 8 Drawing Sheets

(58) Field of Classification Search
USPC .......................................................... 703/10, 6
See application file for complete search history.

(56) References Cited

U.S. PATENT DOCUMENTS

| | | |
|---|---|---|
| 2007/0284147 A1 | 12/2007 | Moran |
| 2012/0026002 A1 | 2/2012 | Vu et al. |
| 2013/0076525 A1 | 3/2013 | Vu et al. |
| 2014/0318864 A1 | 10/2014 | Nield |
| 2015/0014058 A1 | 1/2015 | Wassell et al. |
| 2016/0201449 A1 | 7/2016 | Dirksen et al. |
| 2018/0106134 A1 | 4/2018 | Meehan et al. |
| 2019/0242204 A1* | 8/2019 | Skaugen ................ E21B 21/08 |

FOREIGN PATENT DOCUMENTS

| | | | |
|---|---|---|---|
| GB | 2 434 881 A | 8/2007 | |
| GB | 2518282 A | 3/2015 | |
| WO | WO 2011/014171 A1 | 2/2011 | |
| WO | WO 2011/071479 A1 | 6/2011 | |
| WO | WO 2011/155942 A1 | 12/2011 | |
| WO | WO-2015026502 A1 * | 2/2015 | ............. E21B 44/00 |

* cited by examiner

DRILLING SYSTEMS AND METHODS

CROSS REFERENCE TO PRIOR APPLICATIONS

This application is a U.S. National Phase application under 35 U.S.C. § 371 of International Application No. PCT/NO2019/050161, filed on Aug. 7, 2019 and which claims benefit to Great Britain Patent Application No. 1813074.0, filed on Aug. 10, 2018. The International Application was published in English on Feb. 13, 2020 as WO 2020/032802 A1 under PCT Article 21(2).

FIELD

The present invention relates to a drilling systems and method of operating a drilling system, including but not limited to systems and methods for operating offshore drilling rigs and associated equipment.

BACKGROUND

In drilling operations, such as offshore petroleum exploration, various operations are usually carried out by highly specialized vessels or rigs. The operation of such vessels or rigs can be very costly and make up a substantial part of the cost of a well. Due to the high cost, operational efficiency and reliability during these processes is of great importance.

Moreover, as regulatory requirements become ever-more stringent, while for example petroleum exploration takes place in more challenging areas (such as deepwater fields or arctic areas), safety is also a key issue among most stakeholders in the relevant industries. For example, controlling the relevant process variables within certain margins is crucial in petroleum drilling operations in order to maintain the stability of the formation, avoid loss of drilling fluid (commonly known as mud), and avoiding uncontrolled influx of reservoir fluids into the wellbore.

Modern drilling systems comprise many interacting pieces of equipment and dozens of sensors, directed toward such increasingly deep reservoirs, challenging formations, and deeper water drillsites, and/or for generally improved monitoring and control of drilling operations. As a result, a driller and his/her associates must manage a flow of information that is both broader and more granular than that of previous drilling systems. A modern drill team must maintain safety, efficiency, and environmental compliance despite a flood of information that may become overwhelming. A system that sorts, manages, and optimizes this flood of information may beneficially improve modern drilling activities.

There is consequently a need for improved systems and techniques for operating drilling plants efficiently, while maintaining high safety standards. The present invention has the objective to provide drilling systems and methods which can realise advantages over known solutions and techniques in the above-mentioned or other areas.

SUMMARY

According to a first aspect we provide a drilling system comprising a drilling electronic control unit (ECU) having a data processing apparatus with a machine control connection, the data processing apparatus being configured to transmit machine control signals to at least one machine used to drill a wellbore via the machine control connection, a parameter input port whereby the data processing apparatus may be connected to at least one sensor for receipt of a data stream of readings from the sensor, the sensor readings relating to a physical state of part of the drilling system or the state of operation of a machine in the drilling system, and a remote data connection for the transmission of data to and receipt of data from a remote data processing apparatus, wherein the data processing apparatus is programmed to use data received through the remote data connection to determine at least one parameter boundary. The parameter boundary may therefore be reevaluated continuously, or at intervals, during a drilling operation, based on data received through the remote data connection, and can therefore be optimized throughout a drilling operation.

The drilling system may further comprise a drilling control visual display apparatus which is connected to the data processing apparatus of the drilling ECU and which is configured to display an output determined by a comparison of the data received at the parameter input port with the parameter boundary.

The drilling control visual display apparatus may also be configured to display, in real time, or substantially real-time, the data received at the parameter input port.

The data processing apparatus may be programmed to display on the drilling control visual display apparatus a visual alert if the data received at the parameter input port falls outside the parameter boundary.

The data processing apparatus may further be programmed to use the results of the comparison of the data received at the parameter input port with the parameter boundary to determine a machine control signal, and to transmit the machine control signal from the machine control connection.

The drilling ECU is advantageously located on an offshore drilling rig, and the processing apparatus located in a driller's cabin at or adjacent the drill floor.

In this case, the drilling system may further comprise a land based data processing apparatus which is connected to the remote data connection of the drilling ECU by means of a connection which allows for transmission of data between the land based data processing apparatus and the data processing apparatus of the drilling ECU.

The drilling system may further comprise a land based visual display apparatus which is connected to the land based data processing apparatus and configured to display the data received from the drilling ECU via the remote data connection.

The land based data processing apparatus may be connected to the drilling ECU using a wireless communication link.

The drilling system may further comprise a land based user input apparatus, such as a key board or touch screen, which is connected to the land based data processing apparatus, the land based data processing apparatus being configured to transmit data derived from inputs received from the user input apparatus to data processing apparatus of the drilling ECU via the remote data connection.

The drilling system may further comprise a central visual display apparatus which is connected to the drilling ECU via the remote data connection, and configured to display the data received from the drilling ECU via the remote data connection.

The drilling system may comprise a rig based central data processing apparatus which is connected to the remote data connection of the drilling ECU by means of a connection which allows for transmission of data between the central data processing apparatus and the data processing apparatus of the drilling ECU. The central data processing apparatus is advantageously located on the drilling rig, in a location which is remote from the drilling floor.

The central visual display apparatus may be connected to the central data processing apparatus.

The central data processing apparatus may be connected to the drilling ECU using a wireless communication link.

The drilling system may further comprise a central user input apparatus, such as a key board or touch screen, which is connected to the central data processing apparatus, the central data processing apparatus being configured to transmit data derived from inputs received from the user input apparatus to data processing apparatus of the drilling ECU via the remote data connection.

The parameter input port may be process parameter input port, and the drilling system may further comprise at least one sensor which is adapted to measure a physical state of part of the drilling system, and which is connected to the process parameter input port of the data processing apparatus of the drilling ECU, the sensor being configured to send a stream of data representing the physical state of the part of the drilling system to the drilling ECU via the process parameter input port.

The sensor may, for example, be a temperature sensor or a pressure sensor which arranged to measure the temperature and pressure of fluid in the wellbore, a pressure sensor which is arranged to measure the pressure of the mud downstream of the main mud pump, a load sensor which is arranged to measure the load on the hook, a load sensor which is arranged to measure the WOB, or a flow meter which is arranged to measure the rate of mud flow into the drill string.

The drilling system may further comprise at least one machine which is operable to play a part in the drilling of a wellbore, the machine being connected to the drilling ECU via the machine control connection and being controllable by means of machine control signals received from the drilling ECU via the machine control connection.

The machine could, for example, be a top drive which is operable to rotate a drill string, a pump which is operable to pump drilling mud into the drill string, a choke or valve which is operable to control the flow of drilling mud into or out of the drill string or wellbore, or a hoisting system which is configured to raise or lower the drill string into or out of the wellbore.

The drilling system may further be provided with a user operable machine control input apparatus which is connected to the drilling ECU, the data processing apparatus being configured to transmit machine control instructions via the machine control connection depending on the input received from the user operable machine control input apparatus. The user operable machine control input apparatus could be a joystick, keypad, or a touchscreen.

The machine control connection may also be a parameter input port, and the machine may be configured to send a data stream representing an operational parameter, an operational parameter being an aspect of the physical state of operation of the machine, to the drilling ECU via the machine control connection in real time or substantially real time. In this case, the machine may be provided with a sensor which measures the operational parameter, the sensor being configured to send a data stream of its measurements to the drilling ECU via the machine control connection in real time or substantially real time. The sensor could, for example, be a rotational speed sensor which measures the speed of operation of the top drive or pump, a position sensor which measures the degree of extension of a cylinder in the hoisting system, or a pressure sensor which measures the fluid pressure in a cylinder of the hoisting system.

The data processing apparatus of the drilling ECU may be programmed to use data received through the remote data connection to determine at least one operational parameter boundary, and to compare the operational parameter data received at the machine control connection with the operational parameter boundary.

Where a drilling control visual display apparatus is provided, the drilling control visual display apparatus may be configured to display the operational parameter in real time or substantially real time.

The data processing apparatus may be programmed to display on the drilling control visual display apparatus a visual alert if the operational parameter input port falls outside the operational parameter boundary.

The data processing apparatus may further be programmed to use the results of the comparison of the operational parameter with the operational parameter boundary to determine a machine control signal, and to transmit the machine control signal from the machine control connection.

The data processing apparatus may have a memory in which is stored a process model, the process model including information concerning the link between the process parameters and the operational parameters, and the data processing apparatus be programmed to use the process model to determine what changes need to be made to the operational parameters to ensure that the process parameters are returned to or maintained within the process parameter boundaries. The process model may, for example be derived from measured data from other wellbores and/or historical data logged earlier in the drilling operation.

The data processing apparatus can be programmed to display on the drilling control visual display apparatus instructions as to how the operational parameters need to be changed.

The data processing apparatus may be programmed determine machine control signals based on its determination of what changes need to be made to the operational parameters to ensure that the process parameters are returned to or maintained within the process parameter boundaries, and to transmit these machine control instructions from the machine control connection.

According to a second aspect we provide an offshore drilling rig having a drill floor and a driller's cabin located on, adjacent or overlooking the drill floor, the drilling rig being provided with a drilling system having any feature or combination of features of the drilling system according to the first aspect, wherein the drilling ECU is located in the driller's cabin.

Where provided, the drilling control visual display apparatus and/or the user operable machine control input apparatus is/are also located in the driller's cabin.

Where provided, the land based visual display apparatus, land based data processing apparatus and/or land based user input apparatus is/are located onshore.

Where provided, the central data processing apparatus and/or the central visual display apparatus and/or the central user input apparatus may be located in central control room on the drilling rig which is remote from the drill floor.

According to a third aspect we provide a method of operating a drilling system comprising a drilling electronic control unit (ECU) having a data processing apparatus with a machine control connection, the data processing apparatus being configured to transmit machine control signals to at least one machine used to drill a wellbore via the machine control connection, a parameter input port whereby the data processing apparatus may be connected to at least one sensor for receipt of a data stream of readings from the sensor, the sensor readings relating to a physical state of part of the drilling system or the state of operation of a machine in the drilling system, and a remote data connection for the transmission of data to and receipt of data from a remote data processing apparatus, the method comprising using data received through the remote data connection to determine at least one parameter boundary. The parameter boundary may therefore be reevaluated continuously, or at intervals, during a drilling operation, based on data received through the remote data connection, and can therefore be optimized throughout a drilling operation.

The method may further comprise displaying on a drilling control visual display apparatus an output determined by a comparison of the data received at the parameter input port with the parameter boundary.

The method may further comprise displaying on a drilling control visual display apparatus, in real time, or substantially real-time, the data received at the parameter input port.

The method may further comprise displaying on the drilling control visual display apparatus a visual alert if the data received at the parameter input port falls outside the parameter boundary.

The method may further comprise using the results of the comparison of the data received at the parameter input port with the parameter boundary to determine a machine control signal, and to transmit the machine control signal from the machine control connection.

The drilling ECU may be located on an offshore drilling rig, and the data processing apparatus located in a driller's cabin at or adjacent the drill floor, the method further comprising transmitting data received at the parameter input port to a land based data processing apparatus which is connected to the remote data connection of the drilling ECU by means of a connection which allows for transmission of data between the land based data processing apparatus and the data processing apparatus of the drilling ECU.

The method may further comprise displaying on a land based visual display apparatus the data received by the land based data processing apparatus from the drilling ECU via the remote data connection.

The method may further comprise transmitting data derived from inputs received from a land based user input apparatus which is connected to the land based data processing apparatus, to the data processing apparatus of the drilling ECU via the remote data connection.

The method may further comprise determining the identity of the user entering an input into the land based user input apparatus, and restricting the input that user can enter using the land based user input apparatus or the data transmitted to the data processing apparatus of the drilling ECU via the remote data connection derived from the inputs received from the land based data processing apparatus, according to the identity of the user.

The method may further comprise determining the identity of the user entering an input into the land based user input apparatus, and using the data derived from inputs received from the land based user input apparatus and transmitted to the drilling ECU via the remote connection in determining a parameter boundary depending on the identity of the user.

The drilling ECU may be located on an offshore drilling rig, and the data processing apparatus located in a driller's cabin at or adjacent the drill floor, the method further comprising transmitting data received at the parameter input port to a rig based central data processing apparatus which is connected to the remote data connection of the drilling ECU by means of a connection which allows for transmission of data between the central data processing apparatus and the data processing apparatus of the drilling ECU.

The method may further comprise displaying on a rig based central visual display apparatus the data received by the central based data processing apparatus from the drilling ECU via the remote data connection.

The method may further comprise transmitting data derived from inputs received from a rig based central user input apparatus which is connected to the central data processing apparatus, to the data processing apparatus of the drilling ECU via the remote data connection.

The method may further comprise determining the identity of the user entering an input into the central user input apparatus, and restricting the input that user can enter using the central user input apparatus or the data transmitted to the data processing apparatus of the drilling ECU via the remote data connection derived from the inputs received from the central data processing apparatus, according to the identity of the user.

The method may further comprise determining the identity of the user entering an input into the central user input apparatus, and using the data derived from inputs received from the central user input apparatus and transmitted to the drilling ECU via the remote connection in determining a parameter boundary depending on the identity of the user.

The method may further comprise displaying on a land based visual display apparatus a first set of data received from the remote data connection of the drilling ECU, and displaying on a rig based central visual display apparatus a second set of data received from the remote data connection of the drilling ECU.

The parameter input port may be a process parameter input port, and the drilling system further comprise at least one sensor which is adapted to measure a physical state of part of the drilling system, and which is connected to the process parameter input port of the data processing apparatus of the drilling ECU, the method further comprising using the sensor to send to the drilling ECU via the process parameter input port a stream of data representing the physical state of the part of the drilling system in real time or substantially real-time.

The drilling system may further comprise at least one machine which is operable to play a part in the drilling of a wellbore, the machine being connected to the drilling ECU via the machine control connection and being controllable by means of machine control signals received from the drilling ECU via the machine control connection which is also the parameter input port, the method further comprising the machine sending a data stream representing an operational parameter to the drilling ECU via the machine control connection, an operational parameter being an aspect of the physical state of operation of the machine in real time or substantially real time.

The method may further comprise using data received through the remote data connection to determine at least one operational parameter boundary and at least one process parameter boundary, and to compare the process parameter data and operational parameter data received at the parameter input port with the process parameter boundary and operational parameter boundary respectively.

The method may further comprise displaying on a drilling control visual display apparatus a visual alert if an operational parameter falls outside an operational parameter boundary or a process parameter falls outside a process parameter boundary.

The method may further comprise using the results of the comparison of the process parameter data and operational parameter data with the process parameter boundary and operational parameter boundary to determine a machine control signal, and to transmit the machine control signal from the machine control connection.

The data processing apparatus may have a memory in which is stored a process model, the process model including information concerning the link between the process parameters and the operational parameters, and the method further comprises using the process model to determine what changes need to be made to the operational parameters to ensure that the process parameter are returned to or maintained within the process parameter boundary.

According to a fourth aspect we provide a computer-readable medium comprising instructions which, when executed by a computer cause the computer to carry out the method of third aspect of the invention.

According to a fifth aspect we provide a computer program comprising instructions which, when the program is executed by a computer causes the computer to carry out the method of the third aspect of the invention.

According to a sixth aspect we provide a drilling control and monitoring system comprising a display apparatus and a data processing apparatus with a machine control connection, the data processing apparatus being configured to transmit machine control signals to at least one machine used to drill a wellbore via the machine control connection, a parameter input port whereby the data processing apparatus may be connected to a plurality of sensors for receipt of a data stream of readings from the sensors, the readings from each sensor providing a parameter and the parameters being divided into a first group and a second group, the data processing apparatus being programmed to use the display apparatus to display the parameters in one of the first or second group of parameters in real-time or substantially real time, and at intervals to compare each parameter in both the first and second group of parameters with at least one parameter boundary, and to use the display to display a visual alert if any of the parameters in the first group and the second group of parameters falls outside its parameter boundary.

The data processing apparatus may be programmed to use the display apparatus to display a first type of visual alert if one the parameters in the displayed group of parameters falls outside its parameter boundary, and to display a second type of visual alert if one of the parameters in the non-displayed group of parameters falls outside its parameter boundary.

The drilling monitoring and control system may further include a user input apparatus, such as a keyboard, mouse, joystick or touchscreen, which may be used by an operator to select which of the first or second group of parameters is displayed.

The data processing apparatus may be programmed to use the display apparatus to display the parameter boundary or boundaries for each parameter of the group of parameters displayed, and to up-date the displayed parameter boundary or boundaries whenever it/they changes/change.

The parameter input port may be process parameter input port, and the drilling system may further comprise at least one sensor which is adapted to measure a physical state of part of the drilling system, and which is connected to the process parameter input port of the data processing apparatus of the drilling ECU, the sensor being configured to send a stream of data representing the physical state of the part of the drilling system to the drilling ECU via the process parameter input port.

The data processing apparatus may be provided with a machine control connection, the data processing apparatus being configured to transmit machine control signals to at least one machine used to drill a wellbore via the machine control connection.

The drilling control and monitoring system may further comprise at least one machine which is operable to play a part in the drilling of a wellbore, the machine being connected to the drilling ECU via the machine control connection and being controllable by means of machine control signals received from the drilling ECU via the machine control connection.

The drilling control and monitoring system may further be provided with a user operable machine control input apparatus which is connected to the drilling ECU, the data processing apparatus being configured to transmit machine control instructions via the machine control connection depending on the input received from the user operable machine control input apparatus. The user operable machine control input apparatus could be a joystick, keypad, or a touchscreen.

The machine control connection may also be a parameter input port, and the machine may be configured to send a data stream representing an operational parameter, an operational parameter being an aspect of the physical state of operation of the machine, to the drilling ECU via the machine control connection in real time or substantially real time. In this case, the machine may be provided with a sensor which measures the operational parameter, the sensor being configured to send a data stream of its measurements to the drilling ECU via the machine control connection in real time or substantially real time.

The data processing apparatus may have a remote data connection and be programmed to reevaluate the parameter boundary or boundaries continuously or at intervals during a drilling operation based on data received at the remote data connection The drilling control and monitoring system may have any feature or combination of features of the drilling system according to the first aspect of the invention.

According to a seventh aspect we provide a user interface for a drilling operation carried out by a drilling system, the user interface displaying a plurality of tabs, each tab, when selected, displaying a range and a live value of a parameter or each one of a set of parameters, the or each parameter representing a physical state of an aspect of the drilling system or a state of operation of an apparatus within the drilling system, the range representing a desired boundary or boundaries for the or each parameter during the drilling operation.

The user interface may be configured to issue an alert to notify a user when the live value of a parameter which is not currently displayed is outside the range for that parameter.

Each range may be updated continuously or at intervals during a drilling operation based on data received from a location remote from the data processing apparatus.

According to a eighth aspect we provide a drilling system according to the first aspect having a user interface according to the seventh aspect.

According to a ninth aspect, we provide a drilling system comprising: a plurality of machines, each machine comprising: a machine sensor configured to sense an operating state of the machine; and an operating range having a lower limit and an upper limit, the operating range representing an acceptable set of operating states under which the machine may operate; a plurality of process sensors, each process sensor comprising: a process sensor value; and a process range having a lower limit and an upper limit, the process range representing an acceptable set of process sensor values during drilling; and a drilling electronic control unit including a data processing apparatus and a memory coupled to the data processing apparatus. The memory includes a process model comprising expected values of the process sensors as a function of drilling depth and a reservoir model comprising geological data for a reservoir to be drilled. The drilling electronic control unit is configured to receive process sensor values from each of the process sensors; receive an operating state from each of the machine sensors; calculate a plurality of first differences between the process sensor values and at least one, particularly both, of the respective upper and lower limits of the process range for each of the process sensors; calculate a plurality of second differences between the operating state of each machine and at least one, particularly both, of the respective upper and lower limits of the machine's operating range; and display the plurality of first and second differences on a drilling screen.

The drilling electronic control unit may be further configured to compare a received process sensor value to an expected value from the process model; and display an indication when a deviation between the process sensor value and the expected value exceeds a threshold.

The drilling electronic control unit may be further configured to identify an expected operating state of at least one machine, particularly using at least one of the process model and the reservoir model; calculate a deviation between the received operating state and the expected operating state for the corresponding machine; and display the deviation on the drilling screen when the deviation exceeds a threshold.

The at least one range may comprises a warning value indicating that the respective process sensor value or operating state is proximate to one of the corresponding upper or lower limits.

The drilling electronic control unit may be further configured display a warning on the drilling screen when at least one of the first and second differences is smaller than a difference between the warning value and the corresponding upper or lower limit.

The drilling electronic control unit may be further configured to display an alarm on the drilling screen when a magnitude of at least one of the first and second differences is equal to or below zero.

The drilling electronic control unit may be further configured to increase an intensity of the alarm when the difference is below zero.

The drilling electronic control unit may be further configured to: select a recent window of drilling time, particularly up to the past 5 minutes, particularly up to the past 60 seconds, particularly up to the past 30 seconds, particularly up to the past 10 seconds of drilling time; and display the process sensor values and operating states for the recent window on the drilling screen.

The drilling electronic control unit may be further configured to: calculate a change in a difference over a window of drilling time, particularly a recent window; and display an indication on the drilling screen when the change exceeds an expected value.

The expected value may vary as a function of drilling depth.

At least one process range and/or operating range may be a function of drilling depth.

At least one of the process model and the reservoir model may be located onshore.

The plurality of machines may comprise one or more of: a top drive, a mud pump, a hoist, and a choke.

The process sensors may comprise one or more of: a temperature sensor, a pressure sensor, and a load sensor.

The plurality of machines may comprise at least three, including at least five, including at least eight machines.

The plurality of process sensors may comprise least three, including at least five, including at least eight process sensors.

The drilling electronic control unit may be further configured to: display a graphical representation of the upper and lower limits on the drilling screen; display a graphical representation of the operating states and process sensor values proximate to their respective upper and lower limits on the drilling screen; and display a graphical representation of the first and second differences on the drilling screen.

The upper and lower limits may form geometric boundaries on the drilling screen; and the operating states and process sensor values may be geometrically disposed between the geometric boundaries, particularly wherein a displayed geometric distance between a state and/or sensor value with respect to its respective upper and lower limits scales with the respective difference between the state or value and the respective limit.

A person skilled in the art will appreciate that various combinations of the above described aspects may form advantageous embodiments according to the present disclosure.

BRIEF DESCRIPTION OF THE DRAWINGS

These and other characteristics will become clear from the following description of illustrative embodiments, given as non-restrictive examples, with reference to the attached drawings, in which.

DETAILED DESCRIPTION

Figure 1:
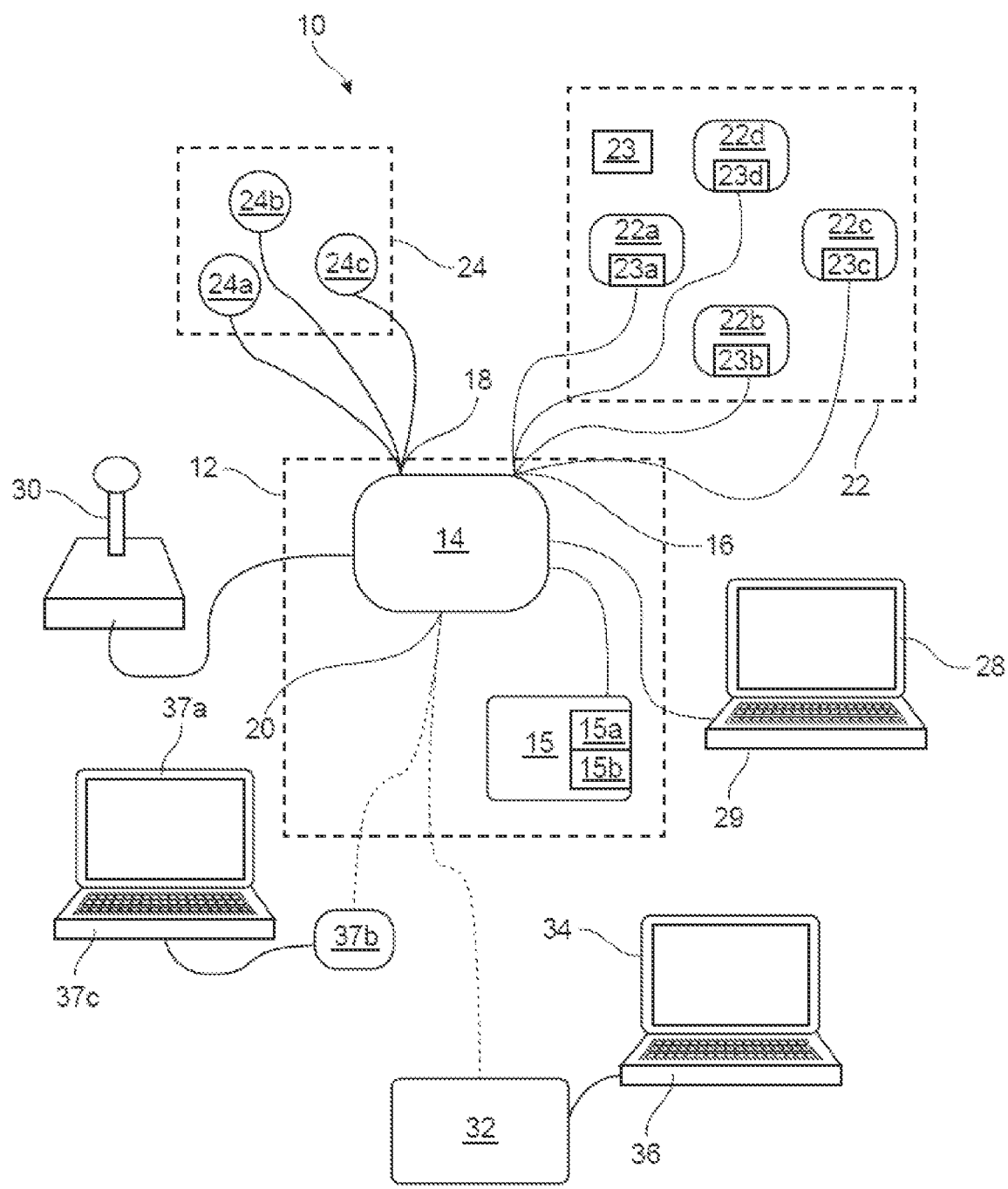
FIG. 1 is a schematic illustration of a drilling system.

When drilling a subsea well bore from an offshore drilling rig, the drilling operation is controlled by a driller who sits in a driller's chair located in a driller's cabin which is at the side of and overlooks the drill floor. Adjacent the driller's chair is a console including the various items of manually operable control equipment, such as joysticks, touchscreens or keypads, which are operable by the driller to control the machines used to drill a wellbore, along with at least one visual display unit, on which the readings from the various sensors on the drill string and elsewhere in the drilling system required by the driller to assist in controlling the drilling are displayed. The sensors measure parameters such as the temperature and pressure in the wellbore and the downward force exerted on the drill bit (known as the weight on bit or WOB). These parameters are hereinafter referred to as process parameters, and are generally monitored to ensure that the drilling operation is conducted safely, without the risk of a blowout. The visual display unit or units may also display information concerning the state of operation of the various machines used to drill a wellbore, hereinafter referred to as operational parameters. For example, where the drill string is suspended on a hook from a hoisting system and rotated using a top drive, and a main mud pump used to pump drilling mud down the drill string, the process parameters could be the degree of extension of or the fluid pressure in a cylinder in the hoisting system, and the speed of operation of the top drive and main mud pump. The operational parameters can also be determined using sensors associated with each machine, such as a position pressure sensor measuring the fluid pressure in the cylinder in the hoisting system, or speed sensor measuring the speed of operation of the main mud pump or the top drive.

The driller is typically also provided with communication apparatus, such as a headset, which is connected to a central control room, which is also on the drilling rig, but which is remote from the drill floor. The driller can use this communications apparatus to relay information concerning the progress of the drilling to personnel in the central control room, and also to receive information, advice or instructions from personnel in the central control room as to how to progress the operation.

The visual display unit or units and control equipment are typically connected to a drilling electronic control unit (ECU) which can provide for automatic or semi-automatic control of the drilling operation. The sensors are connected to the drilling ECU, and send their readings—the process parameters—to the drilling ECU in a plurality of data streams. Similarly, the machines used to drill the wellbore are connected to the drilling ECU, and the drilling ECU programmed to send machine control signals to the control these machines so that the operational parameter(s) of each machine reaches a desired level.

The drilling ECU can send such machine control signals in response to inputs from the control equipment, and in this way, the drilling operation can be manually controlled by the driller. The process parameters are linked to the operational parameters in the sense that the readings from the sensors will be influenced by the state of operation of the machines. For example, the WOB can be varied by retracting or extending a cylinder in the hoisting system, and the temperature and pressure in the wellbore can be varied by altering the rate at which drilling mud is pumped into the drill string, i.e. by varying the speed of operation of the main mud pump. From his experience, the driller may know the desired level of the process parameters, and how to change the operational parameters to bring the process parameters to the desired levels, and can use the control equipment to achieve this.

Advantageously, however, the drilling ECU comprises a memory in which desired upper and/or lower limits of the process parameters, i.e. the process parameter boundaries, are stored. The process parameter boundaries are typically displayed on the visual display unit.

The drilling ECU also comprises a processor which is programmed to compare the process parameters received in the data streams from the sensors to the process parameter boundaries, and to use the visual display unit to provide a visual alert to the driller if any of the process parameters falls outside its process parameter boundaries. The driller can then respond to this by using the control equipment to control the machines, so as to bring the process parameter concerned back to a level within the process parameter boundaries.

The processor may also be programmed with information concerning the link between the process parameters and the operational parameters, and derive from this information, what changes need to be made to the operational parameters to ensure that the process parameters are returned to or maintained within the process parameter boundaries. The processor can be programmed to use the visual display units to instruct the driller how the operational parameters need to be changed, and leave the driller to use the control equipment to make the desired changes manually, or may be programmed automatically to send the appropriate machine control signals without the need for any intervention by the driller.

The information presented to the driller on the visual display unit may also be relayed to and presented on visual display units in the central control room, so that this information can be used by the personnel there, to assist them in advising or instructing the driller.

Referring to FIG. 1, there is shown a schematic illustration of a drilling system 10 comprising a drilling electronic control unit (ECU) 12 having a data processing apparatus 14 (a computer) with a machine control connection 16, a process parameter input port 18, and a remote data connection 20.

The drilling system 10 further comprises a machine 22 which is operable to play a part in the drilling of a wellbore, the machine 22 being connected to the drilling ECU 12 via the machine control connection 16 and being controllable by means of machine control signals generated by the data processing apparatus 14 and received via the machine control connection 16. The machine 22 could be a top drive which is operable to rotate a drill string, a pump which is operable to pump drilling mud into the drill string, a variable choke or valve which is operable to control the flow of drilling mud into or out of the drill string or wellbore, or a hoisting apparatus which is configured to raise or lower the drill string into or out of the wellbore.

Typically the drilling ECU 12 is connected to a plurality of machines, and in this case is connected to a top drive 22a, mud pump 22b, a hoisting apparatus 22c, and an adjustable choke 22d which is operable to vary the degree to which flow of drilling mud out of the wellbore is restricted.

The machines 22a, 22b, 22c, 22d are each configured to send a data stream representing an operational parameter to the drilling ECU 12 via the machine control connection 16 in real time or substantially real time. An operational parameter is an aspect of the physical state of operation of the machine, such as the speed of operation of the pump 22b or top drive 22a, the fluid pressure in or extension of a cylinder in the hoisting system 22c, or the fluid flow rate through the variable choke 22d. To achieve this, each machine 22a, 22b, 22c is provided with a sensor which measures the operational parameter, the sensor being configured to send a data stream of its measurements to the drilling ECU 12 via the machine control connection 16 in real time or substantially real time. In this example, for the top drive 22a and mud pump 22b, the sensor is a rotational speed sensor which measures the speed of operation of the top drive 22a/pump 22b, for the hoisting system 22c there is a position sensor which measures the degree of extension of a cylinder in the hoisting system 22c, and for the variable choke 22d there is a flow meter which measure the rate of flow of fluid through the choke 22d.

The drilling system 10 further comprises at least one sensor 24 which is adapted to measure a physical state of part of the drilling system, and which is connected to the process parameter input port 18 of the data processing apparatus 14 of the drilling ECU 12. The sensor 24 sends a stream of data representing the physical state of the part of the drilling system to the drilling ECU 12—hereinafter referred to as process parameters, via the process parameter input port 18.

The sensor 24 may, for example, be a temperature sensor or a pressure sensor which is arranged to measure the temperature and pressure of fluid in the wellbore, a load sensor which is arranged to measure the load on a hook from which the drill string is suspended, a load sensor which is arranged to measure the WOB, or a flow meter which is arranged to measure the rate of mud flow into the drill string.

Typically the drilling ECU 12 is connected to a plurality of sensors, and in this example it is connected to a temperature sensor 24a and a pressure sensor 24b which are located in the wellbore to measure the temperature and pressure of the fluid in the wellbore, and a load sensor 24c which is located at the bottom of the drill string.

It will be appreciated that the process parameters cannot be controlled directly, but are linked to the operational parameters, so that the process parameters can be controlled indirectly through the control of the operational parameters. For example, the WOB can be increased by operating the hoisting system 22c to lower the drill string, or decreased by operating the hoisting system 22c to raise the drill string. The fluid pressure in the annulus can be increased by increasing the speed of operation of the mud pump 22b and/or operating the variable choke to increase the extent to which it restricts mud flow out of the well bore, and decreased by decreasing the speed of operation of the mud pump 22b and/or operating the variable choke to decrease the extent to which mud flow out of the well bore is restricted. The relationship between the process parameters and operational parameters is complex, however, and in this example, the drilling ECU 12 has a memory 15 in which is stored a process model, the process model including information concerning the relationship between the process parameters and the operational parameters. The process model represents a drilling plan and may, for example, be derived from measured data from other wellbores, and/or historical data logged earlier in the drilling operation.

In this example, the drilling system 10 further comprises a drilling control visual display apparatus—a drilling monitoring and control screen 28, which is connected to the data processing apparatus 14 of the drilling ECU 12 and configured to display information received from the drilling ECU 12. In this example, there is also a keyboard 29 associated with the drilling monitoring and control screen 28 by means of which a user can modify the information presented on the screen 28 and the way it is presented. It will be appreciated that this could also be achieved using a mouse, touch screen or other suitable input apparatus.

The drilling system 10 is also provided with a user operable machine control input apparatus—in this example a joystick 30, which is connected to the drilling ECU 12, which a user may operate to control the machines 24, 24b, 24c.

The drilling ECU 12 is located on an offshore drilling rig, and the drilling system 10 further comprises a land based data processing apparatus 32 which is connected to the remote data connection 20 of the drilling ECU 12 by means of a connection which allows for transmission of data between land based data processing apparatus 32 and the data processing apparatus 14 of the drilling ECU 14. Advantageously, the land based data processing apparatus 32 is located in an onshore office. In a preferred embodiment, the land based data processing apparatus 32 is connected to the drilling ECU using a wireless communication link, for example via an internet cloud connection.

In a preferred embodiment, the drilling system 10 furthers comprise a land based visual display apparatus—drilling monitoring screen 34, which is connected to the land based data processing apparatus and configured to display data received from the drilling ECU 12 via the remote data connection.

In this example, the drilling system 10 further comprises a land based user input apparatus, such as a key board or touch screen 36, which is connected to the land based data processing apparatus 32, and which can be used to input data to the land based data processing apparatus 32.

The drilling system 10 includes a central visual display apparatus—central drilling monitoring screen 37a which is connected to the data processing apparatus 14 of the drilling ECU 12. In this example, the drilling system also includes a central data processing apparatus 37b which is connected to the drilling ECU via the remote data connection, the central visual display apparatus 37a being connected to the central data processing apparatus 37b. In this example, the drilling system 10 further comprises a central user input apparatus 37c, such as a key board or touch screen, which is connected to the central data processing apparatus 37a, and which can be used to input data to the central data processing apparatus 37b.

Figure 2:
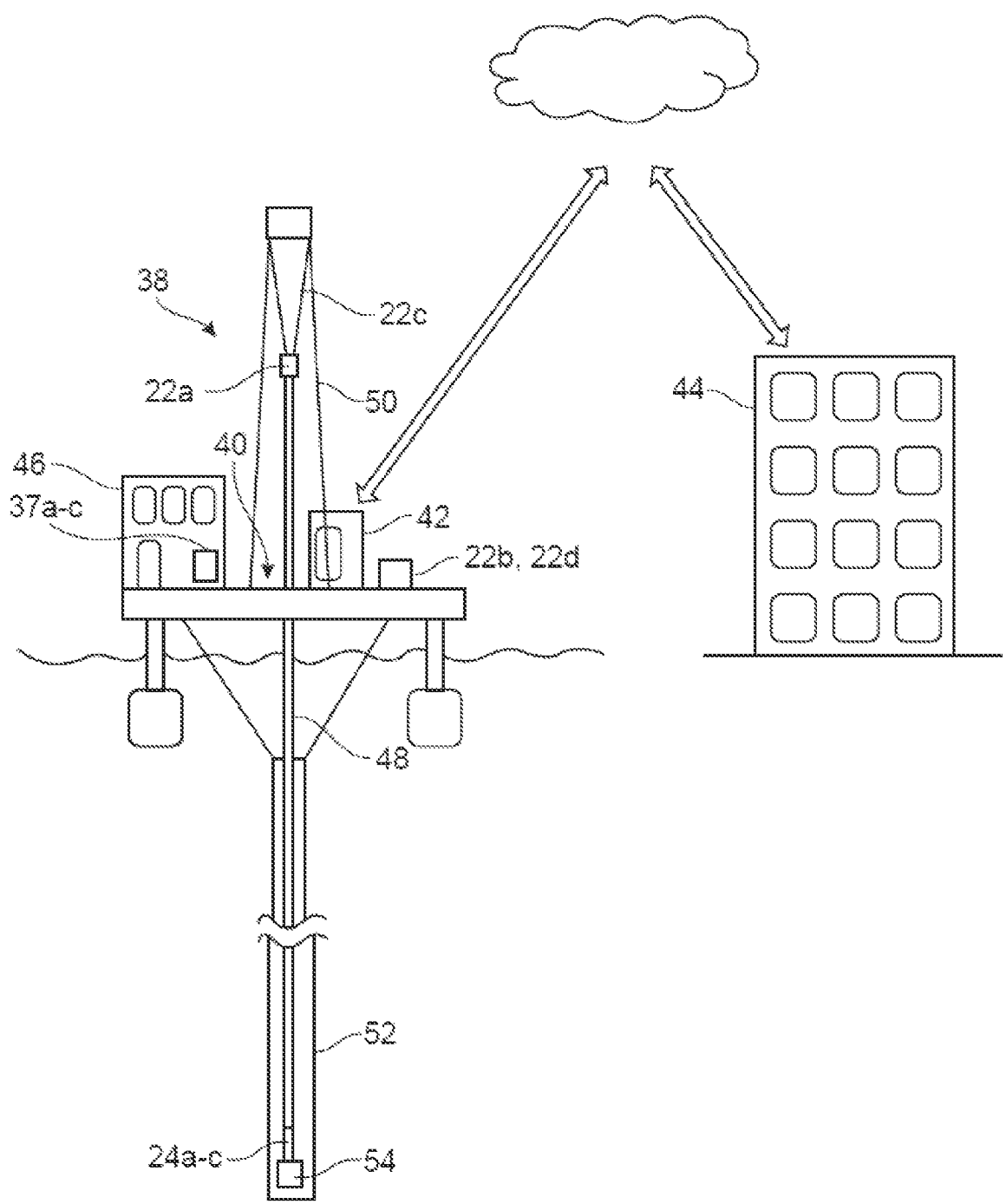
FIG. 2 is a schematic illustration of an offshore drilling rig and onshore office.
Figure 3:
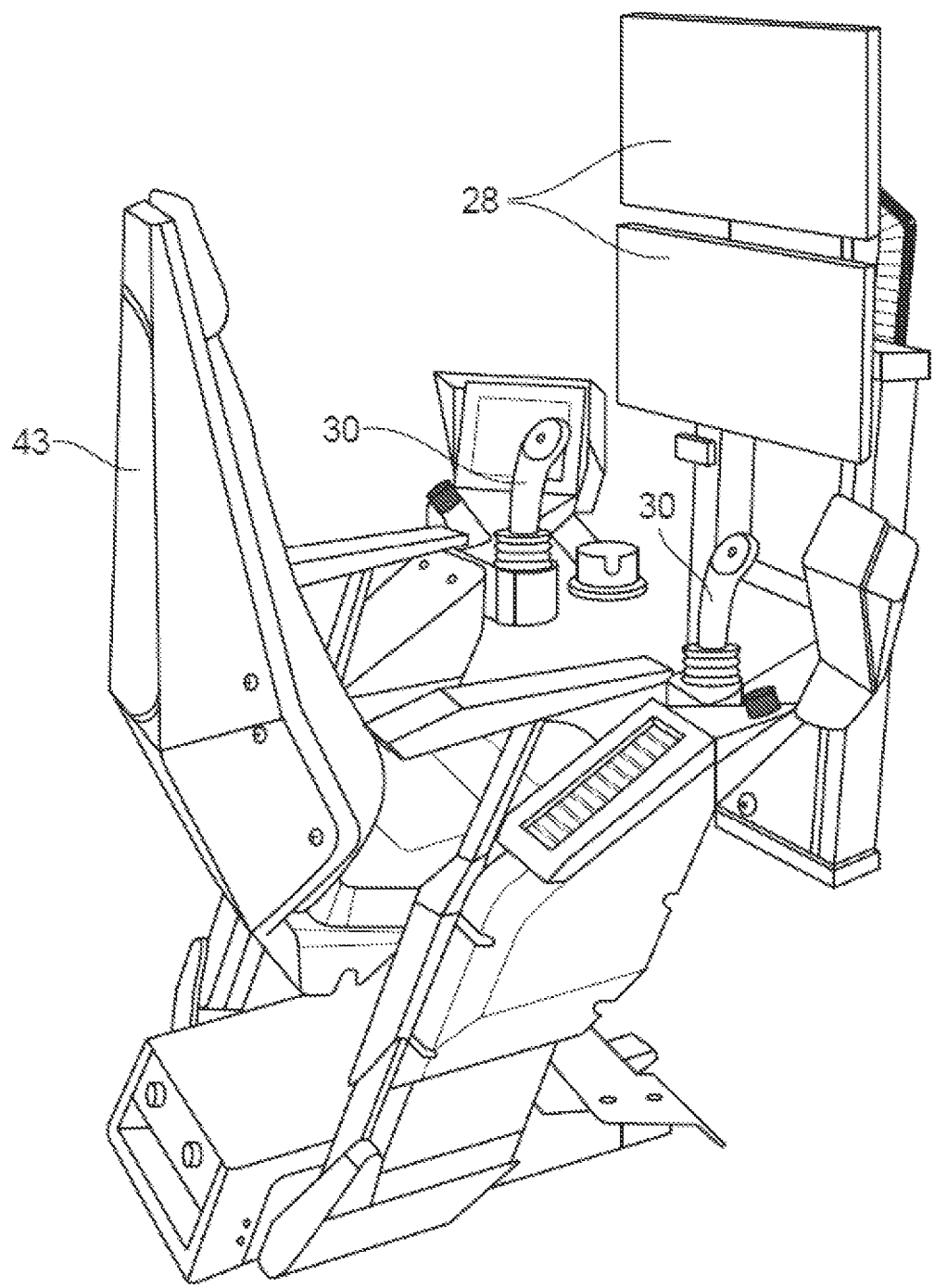
FIG. 3 is a schematic illustration of a driller's chair suitable for use in the drilling system illustration in FIG. 1.

Referring now to FIG. 2, there is shown an offshore drilling rig 38 having a drill floor 40 and a driller's cabin 42 and the edge of and overlooking the drill floor 40. The drilling monitoring and control screen 28 and associated input device, and the joystick 30 of the drilling system 10 are located in the driller's cabin 42 accessible from a driller's chair 43 as illustrated in FIG. 3. The drilling ECU 12 is located on the rig 38, and in this example is also located in the driller's cabin.

The top drive 22a, main mud pump 22b, hoisting system 22c, and variable choke 22d are all provided on the drilling rig 38 as illustrated in FIG. 2. A drill string 48 is suspended using a hook from the hoisting system 22c which is, itself, mounted on a derrick 50. The drill string 48 extends down into a wellbore 52, there being an annular space, known as the annulus, in the wellbore 52 surrounding the drill string 48. A drill bit 54 is mounted at the lowermost end of the drill string 48.

The temperature sensor 24a and pressure sensor 24b may be located in the wellbore annulus, for example at a lower part of the wellbore 52 within the subterranean formation, or on the rig 38 and fluidly connected to the wellbore 52, and the load sensor 24c is mounted on or adjacent the drill bit 54.

The land based drilling monitoring screen 34, land based data processing apparatus 32 and land based user input keyboard are located onshore in an onshore office 44 whilst the central drilling monitoring screen 37 and central user input device 37c (and possible also the central data processing apparatus 37b) are located on the drilling rig 38, but in a different location to the drilling monitoring and control screen 28. In this example, the central monitoring screen 37a, central data processing apparatus 37b and central user input device 37c are located in central control room 46 on the drilling rig 38 which is remote from the drill floor 40.

During an operation such as drilling or tripping (pulling the drill string out of the well bore or returning it back into the well bore), process parameters received from the sensors 24a, 24b, 24c and the operational parameters received from the machines 22a, 22b, 22c, 22d are transmitted from the data processing apparatus 14 of the drilling ECU 12 to the drilling monitoring and control screen 28, where they are displayed in real-time or substantially real time, and can be viewed by the driller.

In this embodiment, the data processing apparatus 14 of the drilling ECU is programmed to set a process parameter boundary for each process parameter, the parameter boundaries setting the desired upper and/or lower limit for the respective parameter. As such, the process parameter boundaries include upper and lower limits for the temperature and pressure in the wellbore 52, and the WOB.

In this embodiment, the data processing apparatus 14 of the drilling ECU 12 is also programmed to use the drilling and monitoring and control screen 28 to display the process parameter boundaries in real time or substantially real time.

The starting values for the process parameter boundaries may be stored in the memory 15 or entered by the driller at the start of the process. It may be known from geological or seismic data obtaining before commencement of the operation, that it will be necessary to change the process parameter boundaries as the drilling progresses. In this case the process model stored in the memory 15 of the data processing apparatus may also contain information which the data processing apparatus 14 uses in setting default process parameter boundaries at various stages throughout the operation. It may, however, be advantageous to make further changes to the process parameter boundaries as the operation progresses. As such, the data processing apparatus 14 is programmed to use data received through the remote data connection 20 to reevaluate the process parameter boundaries continuously, or at least at intervals, during the operation, or on receipt of new data from the remote data connection 20, to ensure that the process parameter boundaries are up-dated and optimized throughout the operation. Depending on the nature of the data received from the remote data connection 20, the data processing apparatus 14 could use this data directly to make a change to one or more of the parameter boundaries, or it could use the data to change the process model from which the default process parameter boundaries for the various stages of the drilling operation are set.

The data processing apparatus 14 is also programmed to relay the process parameters to the land based data processing apparatus 32 via the remote data connection 20, and the land based data processing apparatus 32 is programmed send this data to the land based drilling monitoring screen 34, where they are displayed in real-time or substantially real time. The process parameters can therefore be viewed by onshore personnel who may have expertise or access to information, data or process models which are not available to the driller. For example, the personnel in the office might include a geologist—someone who, for cost and safety reasons, would not normally be stationed on an offshore drilling rig.

The land based data processing apparatus 32 is programmed to transmit data derived from inputs received from the land based keyboard 36 to the data processing apparatus 14 of the drilling ECU 12 via the remote data connection 20. Thus, personnel in the office 44, having viewed the process parameters displayed on the land based drilling monitoring screen can use this information, and with their additional expertise or information, use the land based keyboard 36 to input data or instructions which are relayed to the data processing apparatus 14 of the drilling ECU 12 via the remote data connection 20, and thus have the additional data or instructions used in deriving the process parameter boundaries.

For example, the personnel in the office 44 may include a geologist or have access to geological model of the formation into which the well bore 52 is being drilling which is not available to the driller. This geologist or the geological model might suggest that the drill bit 54 will shortly be entering a part of the formation which contains fluid at a higher pressure than previously. As such, it would be advantageous to increase the fluid pressure in the well bore 52, in order to minimize the risk of a blowout. This information is input into the land based data processing apparatus 32 using the land based keyboard, from where it is relayed to the data processing apparatus 14 of the drilling ECU 12. In response, the data processing apparatus 14 of the drilling ECU 12 modifies process parameter boundaries for the pressure sensor 24b, i.e. the upper and/or lower limits for the downhole pressure.

The data processing apparatus 14 is also programmed to relay the process parameters to the central data processing apparatus 37b via the remote data connection 20, and the central data processing apparatus 37b is programmed send this data to the central drilling monitoring screen 37a, where they are displayed in real-time or substantially real time. The process parameters can therefore be viewed by other personnel on the rig who may have expertise or access to information, data or process models which are not available to the driller without having to locate the other personnel in the relatively hazardous location of the driller's cabin. For example, the other personnel on the rig might include a driller's assistant who has oversight of the composition (and hence density and viscosity) of the drilling mud being used in the operation.

The central data processing apparatus 37b is programmed to transmit data derived from inputs received from the central keyboard 37c to the data processing apparatus 14 of the drilling ECU 12 via the remote data connection 20, so that this data can also be used by the data processing apparatus 14 of the drilling ECU 12 to determine at least one process parameter boundary. Depending on the nature of the data received from the remote data connection 20, the data processing apparatus 14 could use this data directly to make a change to one or more of the parameter boundaries, or it could use the data to change the process model from which the default process parameter boundaries for the various stages of the drilling operation are set. Thus, personnel in the central control room 46, having viewed the process parameters displayed on the central drilling monitoring screen 37a can use this information, and with their additional expertise or information, use the central keyboard 37c to input data or instructions which are relayed to the data processing apparatus 14 of the drilling ECU 12 via the remote data connection 20, and thus have the additional data or instructions used in determining the process parameter boundaries.

For example, rig maintenance personnel may have maintenance information which can set operational limits on equipment or certain operations to avoid process parameters exceeding prescribed limits. A driller's assistant may have information on the construction of the drill string, which may give limitations (e.g. on hoisting or lowering speeds) when certain elements passes given locations in the well (for example, so called "tight spots") to reduce the risk of damage. A DP operator may have information relating to weather or parallel operations (e.g. crane operations) which causes for example pitch and roll of the rig 38. In all cases, boundaries for process parameters can be modified based on such inputted information to ensure that the overall drilling process can proceed in an efficient manner, while maintaining a high safety level.

The data processing apparatus 14 of the drilling ECU 12 is configured to transmit machine control instructions to the machines 22a, 22b, 22c, 22d via the machine control connection 16, depending on the input received from the joystick 30. Thus, the driller may use the joystick 30 to control the machines 22a, 22b, 22c, 22d, and thereby control the drilling operation. The driller may therefore look at the drilling monitoring and control screen 28 to compare the process parameters with the process parameter boundaries, and if any of the process parameters falls outside the process parameter boundaries, from his experience, decide how to control the machines 22a, 22b, 22c, 22d in order to bring that process parameter to within the process parameter boundaries, and then to use the joystick 30 to make the necessary changes to the operation of the relevant machine or machines 22a, 22b, 22c, 22d.

For example, if the downhole pressure needs to be reduced, the driller could use the joystick to reduce the main mud pump speed, and/or decrease the extent to which the variable choke 22d restricts the flow of fluid out of the well bore 52.

In this example, the data processing apparatus 14 of the drilling ECU 12 is programmed to continuously, or at least at intervals, monitor and compare each process parameter with its process parameter boundaries, and to use the drilling monitoring and control screen 28 to display an output based on the results of this comparison. In one embodiment, the data processing apparatus 14 is programmed to display on the drilling monitoring and control screen 28 a visual alert if any of the process parameters falls outside its process parameter boundary.

In one embodiment, the data processing apparatus 14 is programmed to use the process model to determine what changes need to be made to the operational parameters to ensure that the process parameters are returned to or maintained within the process parameter boundaries, and to display on the drilling monitoring and control screen 28 instructions for the driller as to how the operational parameters need to be changed.

In another embodiment, the data processing apparatus 14 is programmed to use its determination of what changes need to be made to the operational parameters to ensure that the process parameters are returned to or maintained within the process parameter boundaries, to determine a machine control signal, and to transmit the machine control signal to the relevant machine or machines 22a, 22b, 22c, 22d via the machine control connection 16. This way, the necessary changes to the operation of the machines 22a, 22b, 22c, 22d may be made automatically without any intervention from the driller.

A similar process may also be carried out in the relation to the operational parameters.

In this embodiment, the data processing apparatus 14 of the drilling ECU is programmed to set an operational parameter boundary for each operational parameter, the parameter boundaries setting the desired upper and/or lower limit for the respective parameter. As such, the operational parameter boundaries include upper and lower limits for the speed of operation of the pump 22b or top drive 22a, the fluid pressure in or extension of a cylinder in the hoisting system 22c, or the fluid flow rate through the variable choke 22d.

In this embodiment, the data processing apparatus 14 of the drilling ECU 12 is also programmed to use the drilling and monitoring and control screen 28 to display the operational parameter boundaries in real time or substantially real time. In this example, standard operational parameter boundaries based on the physical operating limits of the machine in question are stored in the memory 15 of the drilling ECU 12, and are used as the starting point for operational parameter boundaries. It may be known, for example from geological or seismic data obtaining before commencement of the operation, that it will be necessary to change the operational parameter boundaries as the drilling progresses. In this case the process model stored in the memory 15 of the data processing apparatus, may also contain information which the data processing apparatus 14 uses in setting default operational parameter boundaries at various stages throughout the operation. It may, however, be advantageous to make further changes to the process parameter boundaries as the operation progresses. As such, the data processing apparatus 14 of the drilling ECU 12 is also programmed to use data received through the remote data connection 20, in addition to the standard operational parameter boundaries stored in the memory 15 to reevaluate the operational parameter boundaries continuously, or at intervals, during the operation, or on receipt of new data via the remote data connection 20, to ensure that the operational parameter boundaries are up-dated and optimized throughout the operation.

The data processing apparatus 14 is programmed to relay the operational parameters to the land based data processing apparatus 32 via the remote data connection 20, and the land based data processing apparatus 32 is programmed send this data to the land based drilling monitoring screen 34, where they are displayed in real-time or substantially real time. The operational parameters can therefore also be viewed by the onshore personnel.

The personnel in the office 44, having viewed the operational parameters displayed on the land based drilling monitoring screen can use this information, and with their additional expertise or information, use the land based keyboard 36 to input data or instructions which are relayed to the data processing apparatus 14 of the drilling ECU 12 via the remote data connection 20, and thus have the additional data or instructions used in setting the operational parameter boundaries. Depending on the nature of the data received from the remote data connection 20, the data processing apparatus 14 could use this data directly to make a change to one or more of the operational parameter boundaries, or it could use the data to change the process model from which the default operational parameter boundaries for the various stages of the drilling operation are set.

For example, the geologist or the geological model might suggest that the drill bit 54 will shortly be entering a part of the formation which contains harder rock than previously. As such, it would be advantageous to change the envelope of speed of rotation of the drill string in order to optimize the drilling process or minimize damage to the drill bit 54. This information is input into the land based data processing apparatus 32 using the land based keyboard, from where it is relayed to the data processing apparatus 14 of the drilling ECU 12. In response, the data processing apparatus 14 of the drilling ECU 12 alters the operational parameter boundaries for the top drive 22a, i.e. the upper and lower limits for the top drive speed. The data processing apparatus 14 is also programmed to relay the operational parameters to the central data processing apparatus 37b via the remote data connection 20, and the central data processing apparatus 37b is programmed send this data to the central drilling monitoring screen 37a, where they are displayed in real-time or substantially real time. The operational parameters can therefore be viewed by other personnel on the rig who may have expertise or access to information, data or process models which are not available to the driller without having to locate the other personnel in the relatively hazardous location of the driller's cabin. For example, the other personnel on the rig might include a driller's assistant who has oversight of the composition (and hence density and viscosity) of the drilling mud being used in the operation.

The central data processing apparatus 37b is programmed to transmit data derived from inputs received from the central keyboard 37c to the data processing apparatus 14 of the drilling ECU 12 via the remote data connection 20, so that this data can also be used by the data processing apparatus 14 of the drilling ECU 12 to determine at least one operational parameter boundary. Depending on the nature of the data received from the remote data connection 20, the data processing apparatus 14 could use this data directly to make a change to one or more of the parameter boundaries, or it could use the data to change the process model from which the default operational parameter boundaries for the various stages of the drilling operation are set.

Thus, personnel in the central control room 46, having viewed the operational parameters displayed on the central drilling monitoring screen 37a can use this information, and with their additional expertise or information, use the central keyboard 37c to input data or instructions which are relayed to the data processing apparatus 14 of the drilling ECU 12 via the remote data connection 20, and thus have the additional data or instructions used in determining the operational parameter boundaries.

For example, rig maintenance personnel may have maintenance information which can set operational limits on equipment to avoid equipment damage or excessive wear. A driller's assistant may have information on the construction of the drill string, which may give limitations (e.g. on hoisting or lowering speeds) when certain elements passes given locations in the well (for example, so called "tight spots") to reduce the risk of damage. A DP operator may have information relating to weather or parallel operations (e.g. crane operations) which causes for example pitch and roll of the rig 38. In all cases, boundaries for operational parameters can be modified based on such inputted information to ensure that the overall drilling process can proceed in an efficient manner, while maintaining a high safety level.

In this embodiment, the data processing apparatus 14 of the drilling ECU 12 is also programmed to use the drilling and monitoring and control screen 28 to display the operational parameter boundaries in real time or substantially real time. The driller may therefore look at the drilling monitoring and control screen 28 to compare the operational parameters with the operational parameter boundaries, and if any of the operational parameters falls outside the operational parameter boundaries, from his experience, decide how to control the machines 22a, 22b, 22c, 22d in order to bring that operational parameter to within the operational parameter boundaries, and then to use the joystick 30 to make the necessary changes to the operation of the relevant machine or machines 22a, 22b, 22c, 22d.

For example, if the return mud flow rate needs to be reduced, the driller could use the joystick to increase the extent to which the variable choke 22d restricts the flow of fluid out of the well bore 52.

In this example, the data processing apparatus 14 of the drilling ECU 12 is programmed to continuously, or at least at intervals, monitor and compare each operational parameter with its operational parameter boundaries, and to use the drilling monitoring and control screen 28 to display an output based on the results of this comparison. In one embodiment, the data processing apparatus 14 is programmed to display on the drilling monitoring and control screen 28 a visual alert if any of the operational parameters falls outside its operational parameter boundaries.

In this example, the data processing apparatus 14 may be programmed to display on the drilling monitoring and control screen 28 instructions for the driller as to how the operational parameters need to be changed.

In one embodiment, the data processing apparatus 14 is programmed to use its determination of what changes need to be made to the operational parameters, to determine a machine control signal to achieve this, and to transmit the machine control signal to the relevant machine or machines 22a, 22b, 22c, 22d via the machine control connection 16. This way, the necessary changes to the operation of the machines 22a, 22b, 22c, 22d may be made automatically without any intervention from the driller. As, in this example, the drilling ECU 12 receives data from two different sources—the land based office 44 and the central control room 46, it is possible that the data received from one location has a different effect on the process or operational parameter boundaries to the data received from the other location. The data processing apparatus 14 of the drilling ECU 12 is therefore programmed with a control hierarchy, which ensures specifies which data or instructions is to be prioritized in the event of a conflict. A priority controller incorporated into the data processing apparatus 12 can be employed to realise this function. The prioritization may be set individually for each process or operational parameter. For example, the data processing apparatus 12 may be programmed to prioritize data received from the land based data process apparatus 32 over, for example, data received from a maintenance engineer in the central control room 46 when determining the process parameter boundary for the downhole pressure and/or the operational parameter boundary for the mud pump speed, in order that safety-critical boundaries are given preference.

The drilling system 10 may also be programmed to operate a permission system, in which personnel are granted permission to change only certain process or operational parameter boundaries according to their role. For example, the central and/or land based data processing apparatus 37b, 32 may be programmed to require a user to enter an identity or role code before they can use the keyboard 36, 37c to enter data or instructions, and the identity or role code to the drilling ECU 12 with the data/instructions. The date processing apparatus 14 of the drilling ECU 12 may be programmed to use the data received in determining a process or operational parameter boundary, only if the associated identity or role code has permission to make changes to that process or operational parameter. Alternatively, the land based and/or central data processing apparatus 32, 37b may be programmed only to allow a user to enter particular data or instructions, or only to transmit the data or instructions, if the user's identity or role code has the relevant permission.

Whist in this example, all the monitored operational and process parameters are displayed on the land based drilling monitoring screen 34 and the central drilling monitoring screen 37a, but this need not be the case. The drilling ECU 20 may for example, be programmed to transmit only the data relating to a pre-defined first subset of the measured operational and process parameters to the land based data processing apparatus 32, and a pre-defined second subset of the measured operational and process parameters to the central data processing apparatus 37b. The first sub-set and second sub-set may be the same or different, and may change according to the identity of the personnel viewing the data. For example, the central and/or land based data processing apparatus 37b, 32 may be programmed to require a user to enter an identity or role code before any data is displayed on the central drilling monitoring screen 37a/land based drilling monitoring screen 34, and to display only the sub-set of the operational and/or process parameters that user is authorized to view.

Whilst the data or instructions transmitted to the drilling ECU 12 via the remote data connection 20 may be generated as a result of a user input, they may equally be generated by the land based or central data processing apparatus 32, 37b using a stored data and/or a process model to which the data processing apparatus 14 of the drilling ECU 12 does not have access. For example, the land based data processing apparatus 32 may have a memory in which is stored a reservoir model for the formation into which the well bore is being drilling, or may be connected to a separate processor programmed with a reservoir model. The land based data processing apparatus 32 may thus be programmed to use the data received from the drilling ECU 12 in the reservoir model to generate automatically data or instructions relating to the process or operational parameter boundaries, and to transmit the data or instructions to the drilling ECU 12 via the remote data connection 20.

It will be appreciated, of course, that no matter what process or operational parameter boundaries are set by the data processing apparatus, or what automatic machine control instructions are automatically generated by the data processing apparatus as a result, for safety reasons, the system can be set up such that manual control by the driller always takes precedence, as the driller may become aware of potentially hazardous situations or developments which cannot be detected by the system sensors or personnel in remote locations such as the central control room 46 or office 44, by virtue of his presence on the drill floor.

In this embodiment, the data processing apparatus 14 is programmed to use the display on the drilling monitoring and control screen 28 to display the operational parameter boundaries in real time or substantially real time. The driller may therefore look at the drilling monitoring and control screen 28 to compare the operational parameters with the operational parameter boundaries, and if any of the operational parameters falls outside the operational parameter boundaries, from his experience, decide how to control the machines 22a, 22b, 22c, 22d in order to bring that operational parameter to within the operational parameter boundaries, and then to use the joystick 30 or other input devices to make the necessary changes to the operation of the relevant machine or machines 22a, 22b, 22c, 22d.

In this example, the data processing apparatus 14 of the drilling ECU 12 is programmed continuously (or at least at intervals) to compare each operational parameter with its operational parameter boundaries, and to use the drilling monitoring and control screen 28 to display an output based on the results of this comparison. In one embodiment, the data processing apparatus 14 is programmed to display on the drilling monitoring and control screen 28 a visual alert if any of the operational parameters falls outside its operational parameter boundary.

In this embodiment, the data processing apparatus 14 is further programmed to use the results of the comparison of the operational parameters with the operational parameter boundaries to determine an appropriate machine control signal, and to transmit the machine control signal to the relevant machine 22a, 22b, 22c, 22d via the machine control connection 16. Again, in this way, necessary changes to the operation of the machines 22a, 22b, 22c 22d can be made automatically, without the need for any intervention by the driller.

By virtue of some embodiments, the operation can be controlled both reactively, in response to a parameter falling outside its acceptable range, and pre-emptively to control the operation of the machines in anticipation of a parameter falling outside its acceptable range so as to avoid this happening.

Figure 4:
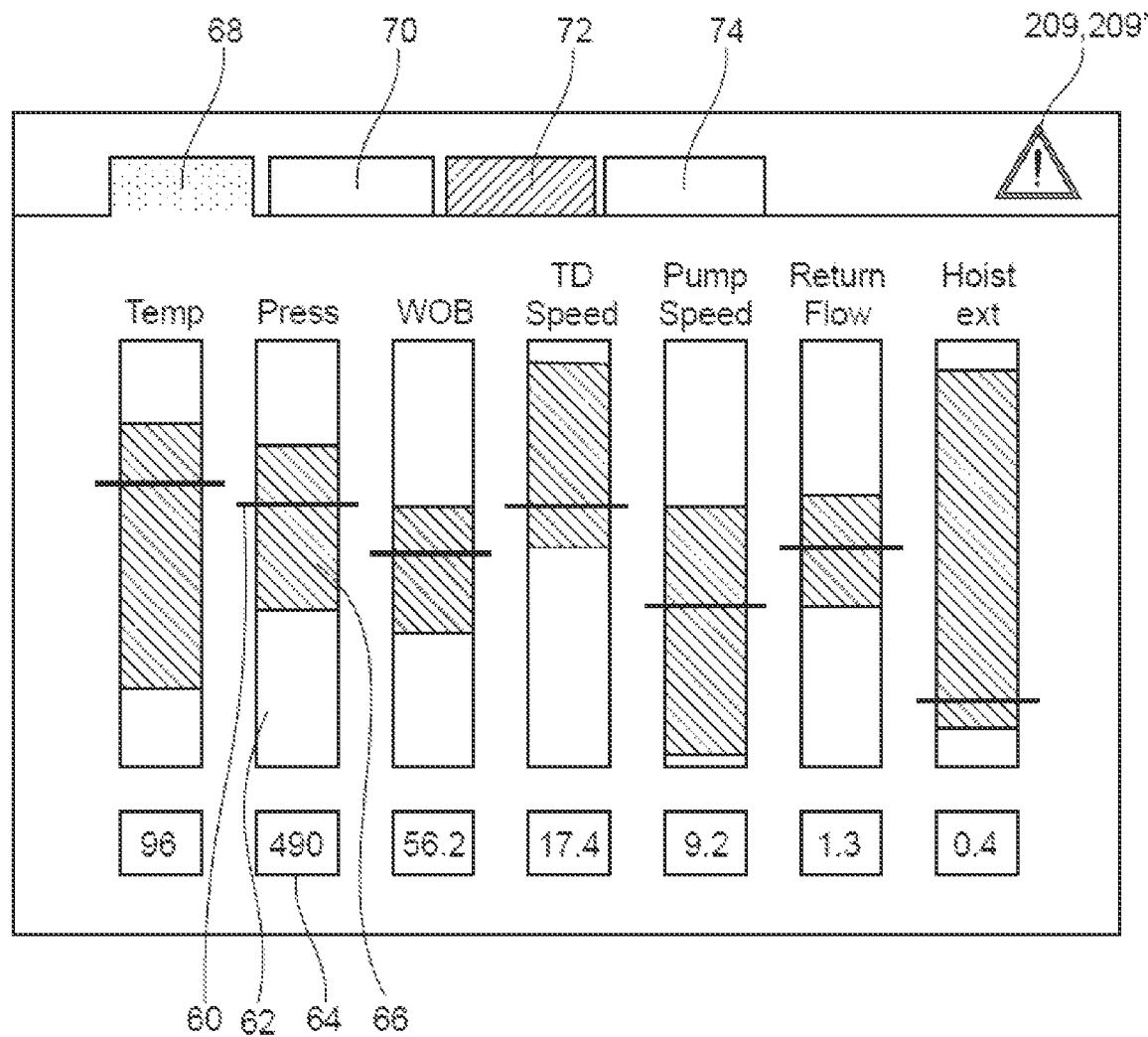
FIG. 4 is an illustration of a first embodiment of drilling monitoring and control display.

A first example of what may be displayed on the drilling monitoring and control screen 28 is illustrated in FIG. 4. In this case, the process parameters displayed are the downhole pressure and temperature, and the WOB, whilst the operational parameters are the top drive speed, main mud pump speed, the return mud flow rate, and the extension of the hoisting apparatus. In this example, each parameter is shown as a line 60 which moves up and down a vertical bar 62 according to the data received at the process parameter input port 18 and the machine control connection 16. Optionally, the current measured value of each parameter is displayed in a box 64 below the relevant bar, and the name or a description of the parameter in question is displayed above.

The process and operational parameter boundaries are represented by a coloured region 66 in each bar, and the data processing apparatus 14 is programmed to change the colour of coloured region 66 whenever a process or operational parameter falls outside its respective boundaries. For example, whilst the process or operational parameter is within the acceptable range, the coloured region 66 showing the parameter boundaries may be coloured blue, but may change to yellow or red when the parameter moves outside the acceptable range, thus alerting the driller.

Figure 5:
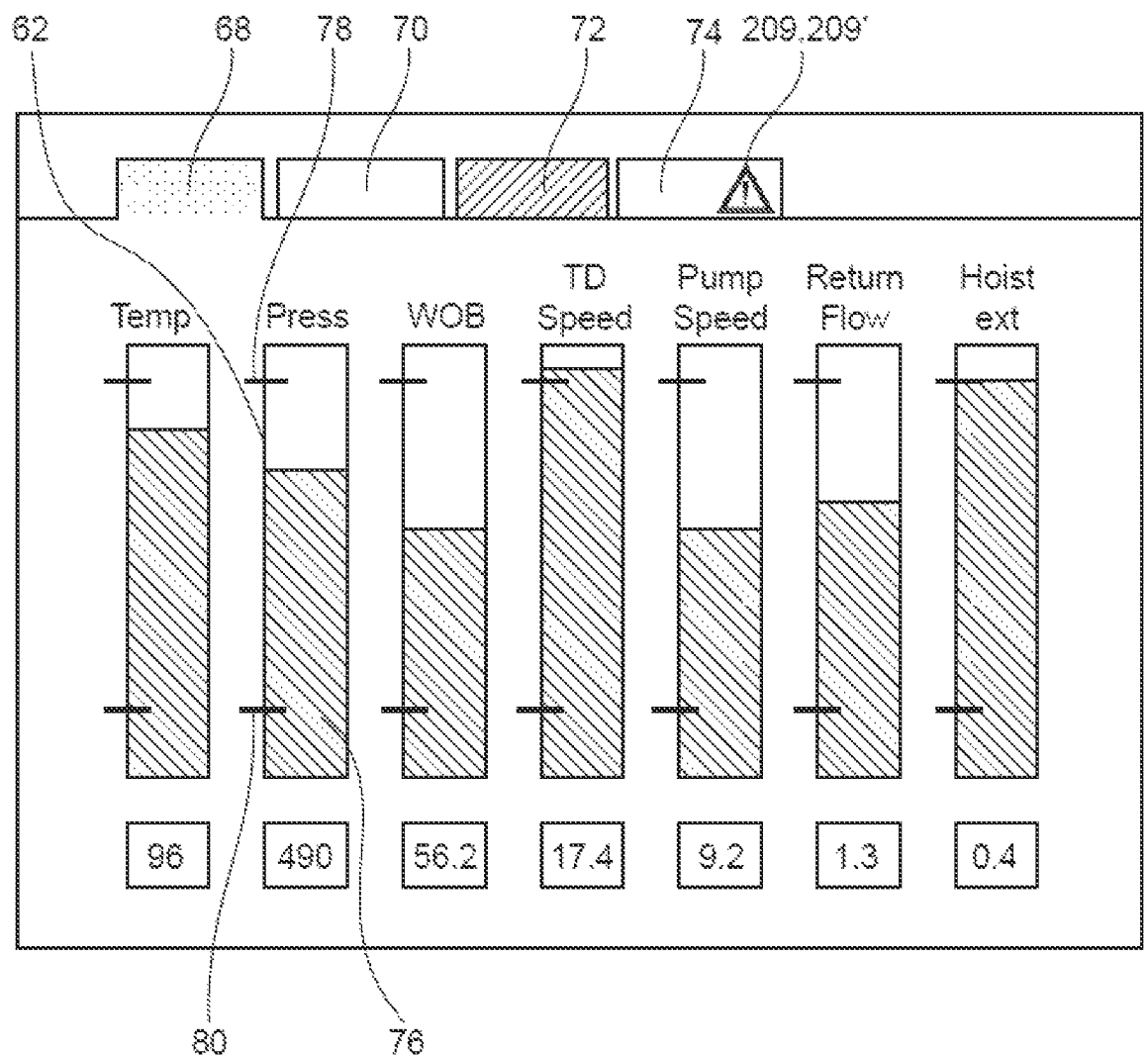
FIG. 5 is an illustration of a second embodiment of drilling monitoring and control display.

A second example of what may be displayed on the drilling monitoring and control screen 28 is illustrated in FIG. 5. In this case, again the process parameters displayed are the downhole pressure and temperature, and the WOB, whilst the operational parameters are the top drive speed, main mud pump speed, the return mud flow rate, and the extension of the hoisting apparatus. In this example, each parameter is shown as a coloured portion 76 of the vertical bar 62, the top level of the coloured portion 76 representing the parameter value according to the data received at the process parameter input port 18 and the machine control connection 16. Optionally, the current measured value of each parameter is displayed in a box 64 below the relevant bar, and the name or a description of the parameter in question is displayed above.

The process and operational parameter boundaries are represented by upper and lower lines 78, 80 in each bar 62. The value of each parameter boundary may be display next to each line.

The data processing apparatus 14 is programmed to change the colour of coloured portion 76 whenever a process or operational parameter falls outside its respective boundaries. For example, whilst the process or operational parameter is within the acceptable range, the coloured portion 76 may be coloured blue, but may change to yellow or red when the parameter moves outside the acceptable range, thus alerting the driller.

It will be appreciated that the invention is not restricted to use with the process and operational parameters listed above, and other parameters may be measured and displayed. Such other parameters could include the hook weight (i.e. the downward force acting on the hook from which the drill string 48 is suspended)—measured using a load sensor mounted on the hook, the stand pipe pressure (i.e. the mud pressure downstream of the main mud pump)—measured using a pressure sensor located in the conduit from the main mud pump to the drill string 48, the hook position (i.e. its height relative to the drilling floor), and the active volume gain/loss (i.e. the differential between the rate of mud flow into the drill string and the rate of return mud flow)—derived from the reading from a flow meter provided in the conduit from the main mud pump to the drill string 48 and the reading from the return flow meter.

Different parameters may be displayed according to the mode of operation of the system. For example, a first set of parameters may be displayed during drilling, and a different set of parameters (which may include some or all of the parameters displayed during drilling) may be displayed during tripping.

If too many parameters are displayed, the display may be cluttered, making it difficult for the driller to monitor the operation effectively. As such, the parameters selected to be displayed during a particular operation may be divided into a plurality of groups, the driller using the keyboard 29 or joystick 30, or other input device, to select which group of parameters is displayed at any one time. One group of parameters may be selected as the most important, and therefore will be displayed by default, but the driller can switch the display to show one of the other groups if need be. For example, the other groups of parameters may be represented in a plurality of tabs 68, 70, 72, 74 located towards the top of the display, and one of the other groups of parameters may be selected for display by clicking on the relevant tab 68, 70, 72, 74.

It will be appreciated that the data processing apparatus 14 may continuously, or at least at intervals, monitor all the parameters, and process the data received from the remote data connection to determine the parameter boundaries for each monitored parameter at all times during the operation, irrespective of which parameters are displayed. Thus, it is possible that, during the operation, changes are made to parameter boundaries not currently shown on the display. It is also possible that one or more of the parameters not currently shown on the display moves outside its acceptable range.

To ensure that the driller is made aware of this, the data processing apparatus 14 can be programmed to use the drilling monitoring and control screen 28 to display a visual warning even if the parameter in question is not one which is currently selected for display. For example, where a plurality of tabs are used as described above, the tab may change colour. The tab 68 representing the group of parameters currently displayed may be one colour (such as blue), and the tabs 70, 74 representing the groups of parameters not being displayed may be another colour (such as white), and a tab 72 may change to a first warning colour (such as to yellow) if the parameters boundaries for one of the parameters in that group has changed, and to a second colour (such as red) if one of the parameters in that group has moved outside its acceptable range. The driller can then click on the relevant tab to see exactly what is happening—which parameter is affected, and whether it is too high or low, and take any appropriate corrective action.

It should be noted that as stated in the description above, the parameters can be measured and displayed, and the parameter boundaries up-dated, in real-time or substantially real-time, and this means that the display is dynamic and, at any one time, is a reasonable representation of the status of the drilling system at the time. It does not necessarily means that the measurements are taken, the measured parameters compared with the parameter boundaries, the parameter boundaries reevaluated or the display up-dated continuously, however. This could be carried periodically or at intervals, provided it is done frequently enough that the information displayed is sufficiently up-to-date that effective control of the drilling process is possible.

In other embodiments, the drilling system 10 may comprise a plurality of machines 22, each machine 22 having a machine sensor 23,23a-d (FIG. 1) configured to sense an operating state 25 (FIG. 7) of the machine. The plurality of machines may, for example, comprise one or more of: a top drive 22a, a mud pump 22b, a hoist 22c, and a choke 22c. The plurality of machines can, for example, comprise at least three, at least five, or at least eight machines.

Figure 7:
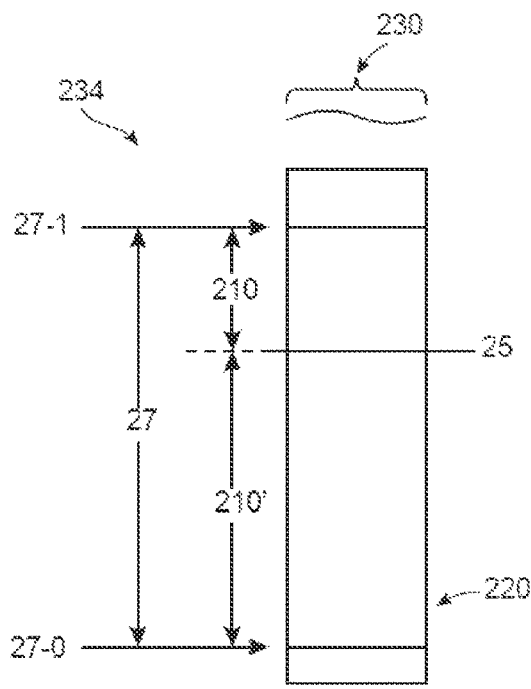
FIG. 7 illustrates parts of a fourth embodiment of a drilling monitoring and control display.

As illustrated in FIG. 7, each machine 22 has an operating range 27 with a lower limit 27_0 and an upper limit 27_1. The operating range 27 represents an acceptable set of operating states under which the machine may operate. (For example, in view of machine speed, force/torque, or other operational parameters.)

Figure 6:
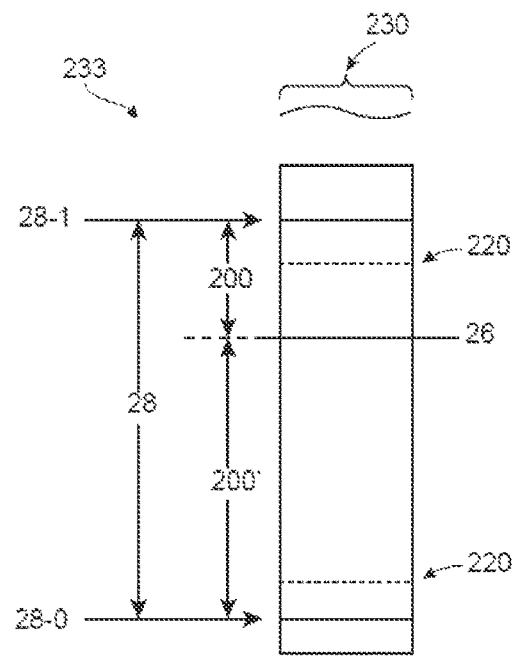
FIG. 6 illustrates parts of a third embodiment of a drilling monitoring and control display.

The drilling system 10 comprises a plurality of process sensors 24, each process sensor having a process sensor value 26 (FIG. 6). The process sensors 24 may, for example, comprise one or more of: a temperature sensor 24a, a pressure sensor 24b, and a load sensor 24c. The plurality of process sensors can, for example, comprise at least three, at least five, or at least eight process sensors.

As illustrated in FIG. 6, each process sensor 24 has a process range 28 having a lower limit 28_0 and an upper limit 28_1, the process range 28 representing an acceptable set of process sensor values during drilling.

The drilling electronic control unit 12 includes a data processing apparatus 14 and a memory 15 coupled to the data processing apparatus 14, wherein the memory 15 includes a process model 15a comprising expected values of the process sensors as a function of drilling depth and a reservoir model 15b comprising geological data for a reservoir to be drilled. (See FIG. 1.)

The drilling electronic control unit 12 is configured to receive process sensor values 26 from each of the process sensors 24; receive an operating state 25 from each of the machine sensors 23; calculate a plurality of first differences 200, 200' (see FIG. 6) between the process sensor values 26 and at least one, particularly both, of the respective upper and lower limits 280, 28_1 of the process range 28 for each of the process sensors 24; calculate a plurality of second differences 210, 210' (see FIG. 7) between the operating state 25 of each machine 22 and at least one, particularly both, of the respective upper and lower limits 27_0, 27_1 of the machine's operating range (26); and display the plurality of first and second differences on a drilling screen 28.

The display 233,234 of the plurality of first and second differences (see FIGS. 6 and 7) may be part of a drilling monitoring and control display as shown in FIG. 4 or 5. For example, a representation as illustrated in FIGS. 6 and 7 may be incorporated into the display of FIG. 4 or 5.

The drilling electronic control unit 12 can be further configured to compare a received process sensor value 26 to an expected value from the process model 15a and display an indication when a deviation between the process sensor value 26 and the expected value exceeds a threshold.

The drilling electronic control unit 12 can be further configured to: identify an expected operating state of at least one machine 22, for example using at least one of the process model and the reservoir model; calculate a deviation between the received operating state 25 and the expected operating state for the corresponding machine 22; and display the deviation on the drilling screen 28 when the deviation exceeds a threshold.

Figure 9:
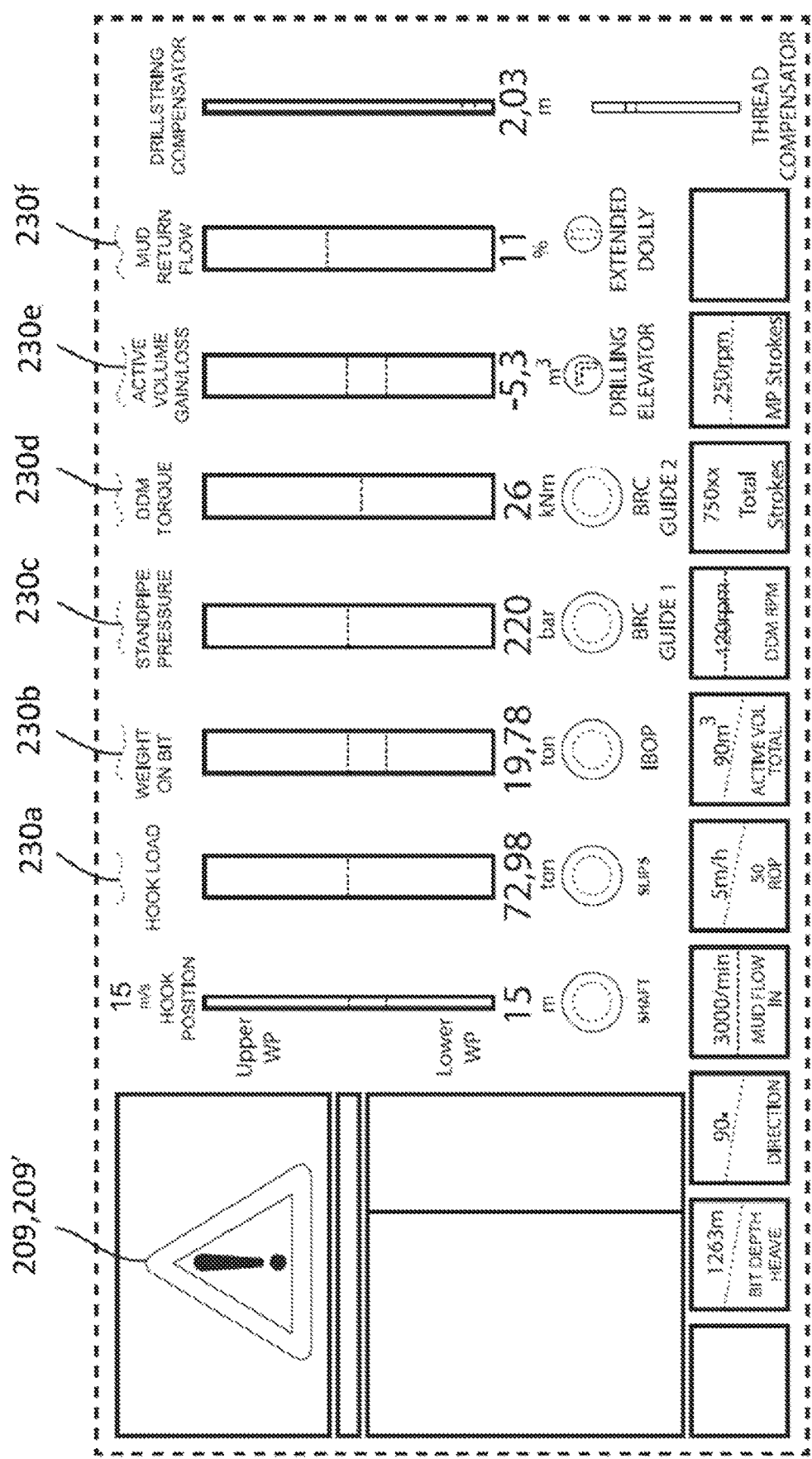
FIG. 9 illustrates a fifth embodiment of drilling monitoring and control display.

One or both of the range 27, 28 can comprise a warning value 220 (see FIG. 6) indicating that the respective process sensor value 26 or operating state 25 is proximate to one of the corresponding upper 271, 28_1 or lower 27_0, 28_0 limits. The drilling electronic control unit 12 can then be further configured display a warning 209 on the drilling screen 28 when at least one of the first and second differences 200, 200', 210, 210' is smaller than a difference between the warning value 220 and the corresponding upper or lower limit. The warning 209 may, for example, be a visual alert notifying the drilling operator, as illustrated in FIGS. 4 and 9.

Advantageously, the drilling system 10 may comprise the features of the seventh aspect (see above), whereby the plurality of first and second differences are displayed in a tab 68,70,72,74 (see FIGS. 4 and 5). The warning 209 may advantageously be provided on the drilling screen 28 in a position which is spaced from the tabs 68,70,72,72, and which is permanently visible, for example as illustrated in FIG. 4. This allows the drilling operator to be alerted in the event of a warning value 220 being reached but not being visible in an active tab 68,70,72,74. The drilling operator may change tabs in order to immediately identify the value in question.

Alternatively, or additionally, the warning 209 may include information identifying the tab 68,70,72,74 which has triggered the warning 209. In this manner, the drilling operator may immediately identify the correct tab to obtain further information.

The drilling electronic control unit 12 may be configured to display an alarm 209' on the drilling screen 28 when a magnitude of at least one of the first and second differences 200, 200', 210, 210' is equal to or below zero. The alarm 209' may be similar to the warning 209, for example the alarm 209' may be represented in the same position or the same manner as the warning 209, but with different colour, different intensity, or some other difference to differentiate the warning and the alarm. Optionally, the drilling system may comprise only the alarm functionality, and no warning.

The drilling electronic control unit 12 can be further configured to increase an intensity of the alarm 209' when the difference is below zero.

Illustrated in FIGS. 6, 7 and 9. the drilling electronic control unit 12 can be further configured to select a recent window 230 of drilling time, for example up to the past 5 minutes, up to the past 60 seconds, up to the past 30 seconds, or up to the past 10 seconds of drilling time, and display the process sensor values 26 and operating states 25 for the recent window 230 on the drilling screen.

The drilling electronic control unit 12 may be further configured to calculate a change in a difference 200, 200', 210, 210' over a window of drilling time, such as a recent window 230; and display an indication on the drilling screen 28 when the change exceeds an expected value.

The expected value may vary as a function of drilling depth. The expected value may, for example, be calculated based on a reservoir model 15b or pulled from a database with expected values mapped against drilling depth values.

At least one process range 28 and/or operating range 27 can be a function of drilling depth. The respective range may, for example, be calculated based on a reservoir model 15b or pulled from a database with range values mapped against drilling depth values.

The drilling control unit may be further configured to receive the expected value and/or the range 27,28 from an onshore location.

Illustrated in FIGS. 6 and 7, the drilling electronic control unit may be configured to: display a graphical representation of the upper and lower limits on the drilling screen; display a graphical representation of the operating states 25 and process sensor values 26 proximate to their respective upper and lower limits on the drilling screen; and display a graphical representation of the first and second differences on the drilling screen.

The upper and lower limits may form geometric boundaries on the drilling screen and the operating states and process sensor values may be geometrically disposed between the geometric boundaries, particularly wherein a displayed geometric distance between a state and/or sensor value with respect to its respective upper and lower limits scales with the respective difference between the state or value and the respective limit.

Figure 8:
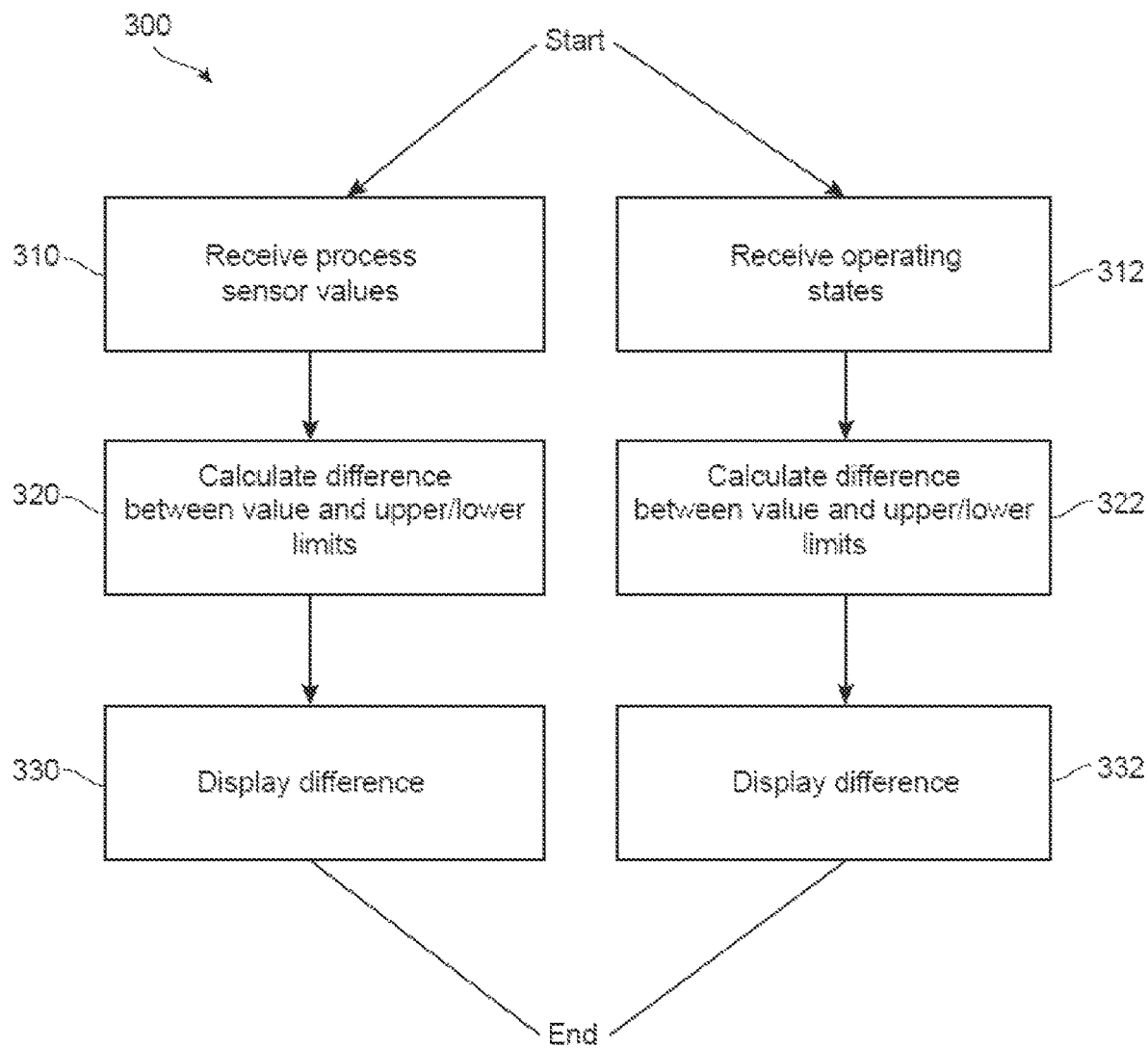
FIG. 8 illustrates a flowchart of a method according to one embodiment.

FIG. 8 is a flow chart 300 illustrating the steps of receiving process sensor values 310, calculate a difference between the value and upper/lower limits 320, and display the difference 330; and correspondingly receive operating states 312, calculate a difference between the value and upper/lower limits 322, and display the difference 332.

FIG. 9 illustrates another example of a display having a plurality of bars side-by-side and where each bar has a recent window 230a-f associated with it, in this case arranged above the respective bar. In this embodiment, the drilling operator may quickly identify a particular situation based on the recent developments in several of the displayed parameter values.

The invention claimed is:
1. A drilling system comprising:
   a remote computer;
   a drilling electronic control unit which comprises,
      a computer comprising a machine control connection, the computer being configured to transmit machine control signals to at least one machine which is used to drill a wellbore via the machine control connection,
      a parameter input port via which the computer is connected to at least one sensor so as to receive a data stream of readings from the at least one sensor as parameter data, the parameter data from the at least one sensor relating to a physical state of a part of the drilling system or a state of operation of a machine in the drilling system, and
      a remote data connection which is configured to transmit data to and to receive data from the remote computer; and
   a user interface for a drilling operation which is carried out by the drilling system, the user interface being operatively connected to the computer and being configured to display a plurality of tabs where each of which, when selected, displays a range and a live value of a parameter or a set of parameters, the parameter or each set of parameters representing the physical state of the part of the drilling system or the state of operation of the machine within the drilling system based on the parameter data, the range representing a desired boundary or desired boundaries for the parameter or for each set of parameters during the drilling operation,
   wherein,
   the range representing the desired boundary or desired boundaries for the parameter or for each set of parameters during the drilling operation is updated continu- ously or at intervals during the drilling operation based on the data received from the remote computer to provide an updated range, instructions inputted into the user interface based on the updated range are transmitted to the computer of the drilling electronic control unit, and the computer of the drilling electronic control unit transmits the instructions, via the machine control connection, as the machine control signals, to make an operational change to the at least one machine which is used to drill the wellbore.

2. The drilling system as recited in claim 1, wherein, the user interface is further configured to issue an alert to notify a user when the live value of the parameter or of each set for parameters which is not currently displayed is outside the range for the parameter or for each set of parameters.

3. The drilling system as recited in claim 1, wherein,
the parameter input port is a process parameter input port, and the drilling system further comprises:
the at least one sensor which is connected to the process parameter input port of the computer of the drilling electronic control unit, the at least one sensor being configured to measure the physical state of the part of the drilling system and to send the data stream representing the physical state of the part of the drilling system to the drilling electronic control unit via the process parameter input port.

4. The drilling system as recited in claim 1, wherein the remote data connection is wireless.

5. A drilling monitoring and control system comprising:
a display apparatus; and
a computer comprising,
a machine control connection, the computer being configured to transmit machine control signals to at least one machine which is used to drill a wellbore via the machine control connection,
a user operable machine control input apparatus operatively connected to the computer, and
a parameter input port,
wherein,
the computer is connected to a plurality of sensors for receipt of a data stream of readings from the plurality of sensors via the parameter input port, the readings from each of the plurality of sensors providing a parameter,
the parameters are divided into a first group of parameters and a second group of parameters,
the computer is programmed to use the display apparatus to display the parameters in the first group of parameters on a first of a plurality of partially overlapping tabs on the display apparatus and to display the second group of parameters on a second of a plurality of partially overlapping tabs on the display apparatus, to compare each parameter in both the first group of parameters and the second group of parameters with at least one parameter boundary, and to use the display apparatus to display a visual alert if any of the parameters in the first group of parameters or in the second group of parameters falls outside a respective parameter boundary,
the visual alert is provided on the display apparatus in a position which is permanently visible on the display apparatus, instructions inputted into the user operable machine control input apparatus based on the visual alert are transmitted to the computer so as to bring the parameter of the first group of parameters or the parameter of the second group of parameters back within the respective parameter boundary, and the computer transmits the instructions, via the machine control connection, as the machine control signals, to make an operational change to the at least one machine which is used to drill the wellbore.

6. The drilling monitoring and control system as recited in claim 5, wherein the computer is further programmed,
to use the display apparatus to display a first type of visual alert if one of the parameters in one of the first group of parameters or the second group of parameters displayed falls outside its respective parameter boundary, and
to display a second type of visual alert if one of the parameters of the one of the first group of parameters or the second group of parameters which are not displayed falls outside of its respective parameter boundary.

7. The drilling monitoring and control system as recited in claim 5, wherein the computer is further programmed to use the display apparatus to display the respective parameter boundary for each parameter of the one of the first group of parameters or the second group of parameters displayed.

8. The drilling monitoring and control system as recited in claim 5, wherein,
the computer further comprises a remote data connection, and
the computer is programmed to reevaluate the respective parameter boundary continuously or at intervals during a drilling operation based on data received at the remote data connection.

9. The drilling monitoring and control system as recited in claim 5, wherein,
the parameter input port is a process parameter input port, the computer is provided as a part of an electronic control unit,
the machine control connection is also the parameter input port, and
the at least one machine is configured to send a data stream representing an operational parameter, which is an aspect of a physical state of operation of the at least one machine, to the electronic control unit via the machine control connection.

10. The drilling monitoring and control system as recited in claim 9, wherein the data stream is sent in real time.

11. The drilling monitoring and control system as recited in claim 5, wherein the display of the parameters is in real time.

12. The drilling monitoring and control system as recited in claim 5, wherein the visual alert includes information identifying each tab of the first of the plurality of partially overlapping tabs which displays the parameter of the first group of parameters which falls outside the respective parameter boundary and/or each tab of the second of the plurality of partially overlapping tabs which displays the parameter of the second group of parameters which falls outside the respective parameter boundary.

\* \* \* \* \*